United States Patent Office 3,349,122
Patented Oct. 24, 1967

3,349,122
PROCESS FOR THE PRODUCTION OF
ALKANE SULFONATES
Ernest Segessemann, Franklin Lakes, N.J., assignor to Atlas Refinery, Inc., Newark, N.J., a corporation of New Jersey
No Drawing. Filed Apr. 6, 1964, Ser. No. 357,736
8 Claims. (Cl. 260—513)

This invention relates to the production of water soluble salts of alkane sulfonic acids by the reaction of sulfurous acid or water soluble sulfurous acid salts with olefins of relatively high molecular weight.

It is known that alkaline sulfonates can be made by the addition reaction of alkali or ammonium bisulfite in aqueous solutions to olefinic double bonds. The reaction however, proceeds in good yields only for olefins of low molecular weight. The processes used heretofore for the sulfitation of olefins of relatively high molecular weight all employ large amounts of water soluble alcohols and they require the presence of oxidizing compounds as reaction initiators. Furthermore, the known processes require the employment of the sulfites in a large excess of the theoretical quantities in order to obtain satisfactory yields. The necessity of recovery of the solvents and of separating the excess sulfites, as well as the need of costly reaction initiators make these processes expensive and of greatly reduced practicability for commercial use.

It is an object of the present invention to provide a process for adding bisulfite ions to olefins in a simple and practical manner without the use of excess reactants and without the use of solvents or reaction initiators and in which high yields of alkane sulfonates are obtained in short reaction times and at moderate temperatures of reaction.

I have discovered a method of reacting water-soluble salts of sulfurous acid or the acid itself with an individual olefin or mixed olefin fraction in the $C_8$–$C_{24}$ range to obtain alkane sulfonates in good yields utilizing equimolecular quantities of the salts or acid and without the use of solvents or reaction initiators.

Broadly, the process of the present invention consists in treating an olefin or a mixture of olefins of relatively high molecular weight with oxygen or molecular oxygen containing gas, such as air, in finely dispersed form at elevated temperature to cause a substantial increase in viscosity, and then reacting the thus bodied olefins with a sulfitation reagent.

The term olefin as used in the description of this invention and the claims herein is meant to include alkenes or polyalkenes, or mixtures thereof, having a total number of carbon atoms, inclusive of side chains, of from about 8 to about 24. The olefins may be olefinic fractions obtained from the cracking of petroleum or they may be olefins obtained by the ethylene polymerization process or olefins obtained by the processing of natural fats. Alkenes or polyalkenes, or mixtures thereof, rich in fractions having at least one double bond in the alpha position are generally preferred, but the process will be applicable equally well with olefins having the double bond or bonds in other positions at distances removed from the terminal carbon atom.

The sulfitation reagent may be an aqueous solution of water soluble salts of sulfurous acid, for example, alkali- or ammonium sulfite or bisulfite or mixtures thereof. The conditions of reaction are widely independent of pH, but it is generally preferable to obtain an end product having a pH of about 6 to 7 and for this reason a mixture of alkali sulfites and alkali bisulfites is preferably employed. Since there is no need of using oxygen or oxidizing agents during the sulfitation reaction, there is no loss of reactants due to oxidation to sulfates.

In accordance with the process of my invention, the olefins are blown with finely dispersed oxygen or a molecular oxygen containing gas such as air at a temperature of from about 90° C. to about 200° C., the preferred temperature being in the range of from about 100° C. to about 130° C. At reaction temperatures less than 90° C. there is very little of end product; at temperatures greater than 200° C. undesirable side reactions take place. Oxygenation is continued until bodying has occurred to the extent that the viscosity has been increased. The nature of the oxygenation reaction is not presently able to be described with precision, but it is believed that there occurs a combination of polymerization, oxidation and peroxidation. It has been found that the extent of the viscosity increase controls the solubility in water of the end product and hence affects the utility thereof as a detergent. I have found that the viscosity increase should be from about five- to about thirty-fold. With less of an increase, the sulfitation yield is diminished; with a greater increase, the solubility in water of the end product is diminished. It is preferred that the viscosity increase be from about five- to about ten-fold. Thus, for example, it has been found that a desirable end product is obtained when the bodying has occurred to the extent that the viscosity has been increased by about 10 to 20 centistokes at 100° F. from an original viscosity at 100° F. of about 3.5 centistokes for a mixed olefin fraction of $C_{15}$ to $C_{20}$. As an alternative, instead of blowing, the oxygen or oxygen-containing gas may be churned into the olefins by means of rapid agitation with a suitably constructed agitator. During the bodying treatment the acid value of the charge increases from an initial value of less than 1 to about 40, expressed in milligrams of KOH per gram of oil.

The bodied olefins are subsequently subjected to a sulfitation reaction desirably by being treated with aqueous solutions of alkali- or ammonium sulfites or bisulfites or preferably a mixture of sulfites and bisulfites. I have found that a desirable end product is obtained when the mole ratio of sulfite to bisulfite is from about 0.65:0.35 to about 0.00;1.00. With a greater proportion of sulfite, the end product has poor solubility in water reducing its utility as a detergent.

The reaction proceeds readily at temperatures as low as 40° C. but it is greatly accelerated at higher temperatures, the preferred range being from about 60° C. to about 100° C. At temperatures below 40° C. the reaction time is unduly prolonged, while external pressure must be applied at temperatures in excess of 100° C.

I have found that when equimolecular quantities of sulfites and olefins are used, a substantially 100% yield of the alkane sulfonates is obtained. It is often desirable, however, not to effect a complete sulfonation. This is accomplished by using only a fraction of the equimolecular weight of the sulfites. The resulting products will form emulsions in water rather than solutions as is the case with complete sulfitation.

For some applications, it is desirable that alkane sulfonates be produced in the form of their salts of organic bases. The organic base is mixed in equimolecular quantities or in some fraction of the equimolecular quantity with the bodied olefins, and water preferably in the amount of about one-quarter to one-half the weight of the olefins is added. Finely dispersed sulfur dioxide gas is then passed through the mixture until the degree of solubility of a test sample in water does not increase any further and the pH of a 5% solution is below 7.0. Organic bases which can be employed in this manner are alkanolamines, such as triethanolamine and triisopropanolamine and diglycolamine.

When equimolecular quantities of sulfites-to-olefins are used, the products of reaction are water soluble and find application as surface active agents, as detergents, as wetting agents, and as components in the formulation of specialty products for the textile, leather, insecticide industries, and in household and industrial cleaning agents. They exhibit good stability to hard water and to alkalies or acids. When the sulfites are used in less than equimolecular quantities, with respect to the olefins, the resulting products form stable emulsions in water and are useful as lubricants in the textile and leather industries, in the metal working industry and for many other industrial applications wherever a water-emulsifiable lubricant is required.

The following detailed examples illustrate the valuable results obtained by the present process. As many variations of reactants and reaction conditions are within the scope of the invention, the examples are illustrative only and the invention is not intended to be limited to the particular materials or reaction conditions recited therein.

*Example 1*

2 kgs. of an olefin fraction made by the California Chemical Company known as Chevron Alpha Olefins and having a carbon range of $C_{15}$ to $C_{20}$ was utilized as a starting material in this example. This olefin fraction had a density of 0.790 g./ml. at 20° C.; a refractive index, $N_D^{20}$ of 1.445; a flash point, TOC, of 265° F.; and an average molecular weight of 243. This material was heated to 115° C. in a stainless steel pot provided with an electric heating mantle. The charge was then aerated by churning with a dispersator type agitator, keeping the temperature between 110° to 120° C. At the end of 20 hours the viscosity had increased to 19.6 centistokes at 100° F. and the acid value (expressed in mg. KOH per gram of oil) was 32. The viscosity of the untreated olefins was 3.4 centistokes at 100° F.

The product thus obtained will be referred to as "bodied olefins" and will be used as the starting material in the succeeding examples.

*Example 2*

250 gms. of the bodied olefins of Example 1 were heated to 80° C. and a hot solution of 45 g. of sodium sulfite and 45 g. of sodium metabisulfite in 300 ml. of water was then slowly added over a period of 10 minutes with moderate agitation. The initially heterogeneous mixture became clear and homogeneous within 30 minutes. The product thus obtained is a light colored, clear viscous liquid at temperatures above 60° C. At room temperature the product is a soft paste. A 5% solution in water has a pH of 6.8.

*Example 3*

250 g. of the bodied olefins of Example 1 were heated to 60° C. and a hot solution of 20 g. of sodium sulfite and 20 g. of sodium metabisulfite in 150 ml. of water were added with agitation. The reaction mass cleared to a homogeneous viscous oil in 15 minutes. The product made a stable fine emulsion in water having a pH of 6.7.

*Example 4*

250 g. of the bodied olefins of Example 1 were heated to 80° C. and a hot solution of 85 g. sodium metabisulfite in 200 ml. of water was added with agitation. After 20 minutes the product was clear and homogeneous forming an opalescent solution in water. The pH of a 5% solution was 5.0.

*Example 5*

250 g. of the bodied olefins of Example 1 were heated to 60° C. There was then added a solution made by mixing 220 g. of ammoniumbisulfite solution of 45% strength with 27 g. ammonia of 28% strength. The reaction mass was then agitated at 60° to 70° C. for 30 minutes whereupon a clear viscous product was obtained. The pH of a 5% solution was 7.1.

*Example 6*

To 200 g. of the bodied olefins of Example 1 was added 100 g. triethanolamine and 50 ml. of water. The charge was heated to 80° C. and sulfur dioxide gas was passed into the mixture until the product was soluble in water. A 5% solution had a pH of 6.9.

*Example 7*

To 200 g. of the bodied olefins of Example 1 was added 85 g. of diglycolamine and 50 ml. of water. The charge was heated to 80° C. and sulfur dioxide gas was passed into the mixture until the product was soluble in water. A 5% solution had a pH of 6.9.

It will be understood in the foregoing description of this invention and in the claims thereto that where pH is referred to, this means pH as measured with a standard calomel glass electrode at 30° C.

It will be further understood that variations and modifications to the foregoing process may be made by those skilled in the art without departing from the spirit and scope of the invention. For example, the sulfitation may be effected by forming the bisulfite ion in situ, as by adding aqueous sodium hydroxide to the bodied olefins and finely dispersing sulfur dioxide gas through the mixture.

What I claim as my invention is:

1. A process for the production of an alkane sulfonate from an alkyl olefin having from eight to twenty-four carbon atoms comprising finely dispersing an oxygen-containing gas at a temperature in the range of about 90° C. to about 200° C. through the said olefin until the viscosity thereof is increased by about five to about tenfold to produce an oxygenated bodied olefin, and reacting the bodied olefin with an aqueous solution of a compound selected from the group consisting of sulfurous acid and a salt of sulfurous acid.

2. The process of claim 1 wherein the bodied olefin is reacted with an aqueous solution of a salt of sulfurous acid.

3. The process of claim 1 wherein the bodied olefin is reacted with an aqueous solution of sodium bisulfite.

4. The process of claim 1 wherein the bodied olefin is reacted with an aqueous solution of ammonium bisulfite.

5. The process of claim 1 wherein the bodied olefin is reacted with an aqueous solution of sodium sulfite and sodium bisulfite, the mole ratio of sodium sulfite to sodium bisulfite being from about 0.65:0.35 to about 0.00:1.00.

6. The process of claim 1 wherein the bodied olefin is reacted with an aqueous solution of a salt of sulfurous acid at a temperature of from about 40° C. to about 100° C.

7. A process for the production of an alkane sulfonate from an alkyl olefin having from eight to twenty-four carbon atoms comprising finely dispersing an oxygen-containing gas at a temperature in the range of about 90° C. to about 200° C. through the said olefin until the viscosity thereof is increased by about five to about tenfold to produce an oxygenated bodied olefin adding to the bodied olefin an organic base, and finely dispersing sulfur dioxide through the mixture in the presence of water until the product is water soluble.

8. The process of claim 7 wherein the organic base is selected from the group consisting of triethanolamine, triisopropanolamine and diglycolamine.

References Cited

FOREIGN PATENTS 1,071,071  8/1954  France.
728,433  4/1955  Great Britain.

OTHER REFERENCES

Farmer et al., Chem. Soc. J. 1942, 121–139. Pages 121–128 and 131–139 relied on.

Houben-Weyl Methoden der Organischen Chemie, vol. 9, 1955 (Stuttgart), 378–80.

Hargrove et al., Trans. Fara. Soc., vol. 52, No. 1 (January 1956), 89–97.

RICHARD K. JACKSON, *Primary Examiner.*

M. WEBSTER, *Assistant Examiner.*